(12) United States Patent
Al-Shehab

(10) Patent No.: US 10,312,742 B1
(45) Date of Patent: Jun. 4, 2019

(54) WIRELESS POWER TRANSMISSION SYSTEM

(71) Applicant: Jenan E. S. SH. M. Al-Shehab, Safat (KW)

(72) Inventor: Jenan E. S. SH. M. Al-Shehab, Safat (KW)

( * ) Notice: Subject to any disclaimer, the term of this patent is extended or adjusted under 35 U.S.C. 154(b) by 0 days.

(21) Appl. No.: 16/154,625

(22) Filed: Oct. 8, 2018

(51) Int. Cl.
*H02J 50/12* (2016.01)
*H02J 7/00* (2006.01)
*H02J 7/02* (2016.01)

(52) U.S. Cl.
CPC ............ *H02J 50/12* (2016.02); *H02J 7/0054* (2013.01); *H02J 7/025* (2013.01)

(58) Field of Classification Search
CPC ...... H02J 7/0042; H02J 7/0054; H04B 5/0093
USPC .................. 320/108, 141, 145, 158, 163
See application file for complete search history.

(56) References Cited

U.S. PATENT DOCUMENTS

| | | | |
|---|---|---|---|
| 9,614,396 B1 | 4/2017 | Bait-Suwailam et al. | |
| 9,627,917 B2 | 4/2017 | Yan et al. | |
| 2004/0174318 A1 | 9/2004 | Aisenbrey | |
| 2012/0176085 A1 | 7/2012 | Lida et al. | |
| 2013/0119929 A1* | 5/2013 | Partovi ................... | H02J 7/025 320/108 |
| 2013/0187598 A1 | 7/2013 | Park et al. | |
| 2013/0188397 A1* | 7/2013 | Wu .......................... | H01F 38/14 363/17 |
| 2014/0046707 A1 | 2/2014 | Hama | |
| 2015/0042268 A1 | 2/2015 | Chen et al. | |
| 2015/0054450 A1 | 2/2015 | Chen et al. | |
| 2015/0130408 A1 | 5/2015 | Wei | |
| 2015/0179335 A1 | 6/2015 | Oh et al. | |
| 2015/0188322 A1 | 7/2015 | Lee et al. | |

(Continued)

FOREIGN PATENT DOCUMENTS

| | | |
|---|---|---|
| CN | 202978382 U | 6/2013 |
| CN | 103405035 A | 11/2013 |

(Continued)

OTHER PUBLICATIONS

Nadler et al., "High Power Wireless Power Transfer for the Industrial Environment", Wurth Electronik, published as Application Note ANP032 at www..we-online.de/app-notes (2016), 26 pages.

*Primary Examiner* — Edward Tso
*Assistant Examiner* — Aaron Piggush
(74) *Attorney, Agent, or Firm* — Richard C. Litman

(57) ABSTRACT

The wireless power transmission system includes a wireless transmitter and wireless receiver for transmission of power. The wireless transmitter includes a DC power supply between 6V and 12V, which may be supplied by a lead-acid battery, or other source. A flat coil defines a radiator, and at least one capacitor parallel to the coil defines a tank circuit. Two banks of MOSFET amplifiers are disposed between the power supply and the tank circuit, each bank having parallel MOSFETS for greater current and power. Two diodes alternately switch the banks on and off. The wireless transmitter generates electromagnetic waves to a wireless receiver having a flat coil or loop inductor to receive the transmission of power, the receiver having a half-wave rectifier and a Zener diode to convert the received power to DC and regulate the voltage for charging a user device, such as a cell phone or other electronic device.

17 Claims, 4 Drawing Sheets

(56) References Cited

U.S. PATENT DOCUMENTS

2015/0381057 A1* 12/2015 Luu .................... H02M 7/5387
                                                                                      363/21.01
2017/0126174 A1    5/2017  Wang et al.

FOREIGN PATENT DOCUMENTS

| CN | 104273941 A | 1/2015 |
|---|---|---|
| CN | 106956630 A | 7/2017 |
| EP | 3138439 A1 | 3/2017 |
| GB | 2531313 A | 4/2016 |
| KR | 1020130048749 A | 5/2013 |
| KR | 1020130134189 A | 12/2013 |
| KR | 1020170092425 A | 8/2017 |

* cited by examiner

US 10,312,742 B1

WIRELESS POWER TRANSMISSION SYSTEM

BACKGROUND

1. Field

The disclosure of the present patent application relates to the wireless transmission of power, and particularly to a wireless power transmission system for powering and charging mobile devices, e.g., cell phones and the like.

2. Description of the Related Art

Wireless charging for mobile devices, such as smartphones and the like, is typically performed through inductive charging. In conventional inductive charging, an electromagnetic field is used to transfer energy between two objects through electromagnetic induction, typically through a charging station adapted for a particular type of device. Energy is sent through an inductive coupling to the electrical device, which can then use that energy to charge batteries or run the device.

Induction chargers commonly use an induction coil to create an alternating electromagnetic field from within a charging base, and a second induction coil in the mobile device (or an associated inductive charging station) takes power from the electromagnetic field and converts it back into electric current to charge the battery. The two induction coils in proximity combine to form an electrical transformer. Greater distances between sender and receiver coils can be achieved when the inductive charging system uses resonant inductive coupling, though there are still operational limits, requiring the inductive coils to remain relatively near one another.

Such charging schemes are not commonplace, primarily because when compared against direct electrical charging, they offer slower charging speeds, they are inconvenient (due to the distance limits between induction coils), and they are relatively inefficient due to both radiative and thermal energy losses. Thus, a wireless power transmission system solving the aforementioned problems is desired.

SUMMARY

The wireless power transmission system includes a wireless transmitter and wireless receiver for transmission of power. The wireless transmitter includes a DC power supply between 6V and 12V, which may be supplied by a lead-acid battery or other source. A flat coil defines a radiator, and at least one capacitor parallel to the coil defines a tank circuit. Two banks of MOSFET amplifiers are disposed between the power supply and the tank circuit, each bank having parallel MOSFETS for greater current and power. Two diodes alternately switch the banks on and off. The wireless transmitter generates electromagnetic waves to a wireless receiver having a flat coil or loop inductor to receive the transmission of power, the receiver having a half-wave rectifier and a Zener diode to convert the received power to DC and regulate the voltage for charging a user device, such as a cell phone or other electronic device.

Alternatively, instead of a flat coil or loop inductor, the wireless receiver may have a copper coil wound around a graphite core for receiving the transmission of power by electromagnetic waves. In this case, the receiver may also have an amplifier circuit for increasing the voltage of the received power to the level required for charging the user device.

In either embodiment, the system is capable of the wireless transfer of power over greater distances than purely inductive wireless power transmission systems due to the greater power transmitted. Also, the present wireless power transmission does not require a charging pad or charging dock, and does not require alignment of the transmitter and receiver coils or magnetic fields to accomplish the wireless transmission of power.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
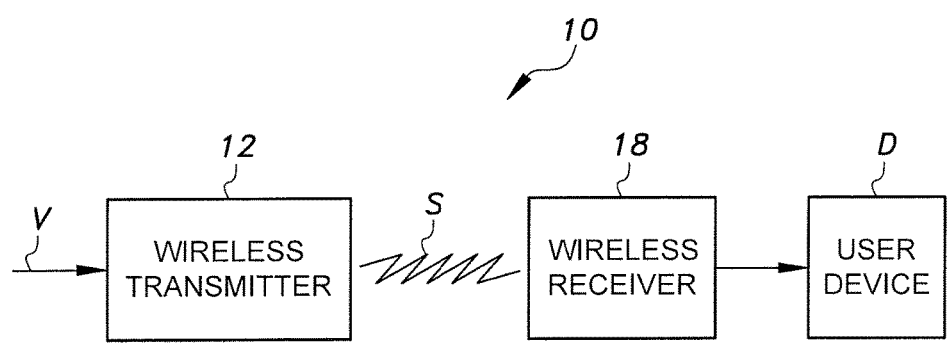
FIG. 1 is a block diagram of a wireless power transmission system.
Figure 2:
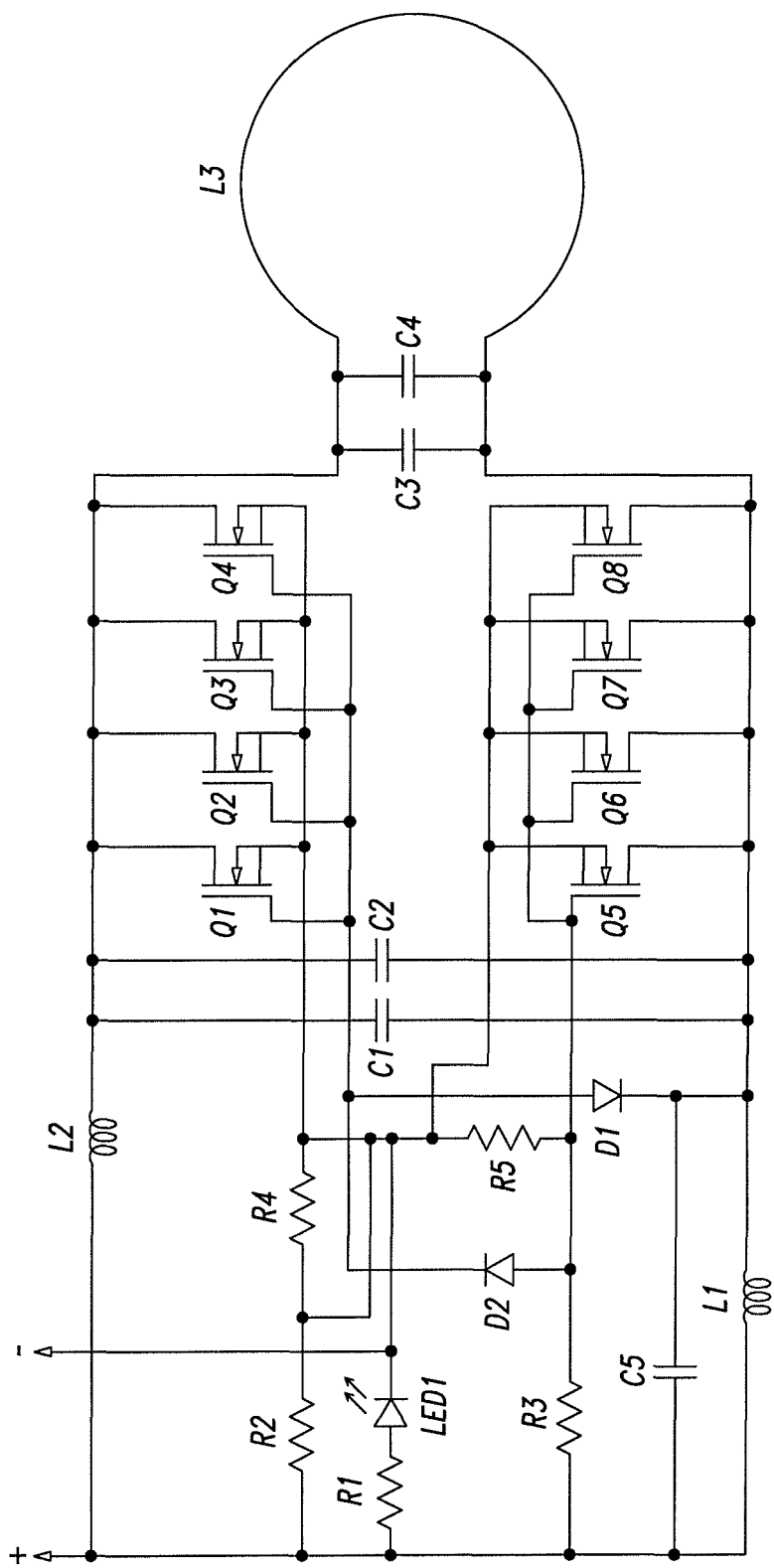
FIG. 2 is a schematic diagram of a wireless transmitter of the wireless power transmission system of FIG. 1.

As shown in FIG. 1, the wireless power transmission system 10 includes a wireless transmitter 12 and wireless receiver 18 for transmission of power wirelessly (shown in FIG. 1 as signal S). Referring to FIG. 2, the wireless transmitter 12 is powered by a DC power supply, which may be supplied by a lead-acid battery of between 6V and 12V, by a DC adapter including a transformer plugged into the AC power mains, by a photovoltaic array of solar cells, or by any other conventional DC power source. Optical LED1 provides a visual indication of when power is supplied to the circuit. Inductor L3 is a flat, spiral coil that transmits electromagnetic waves carrying power wirelessly to a receiver circuit. Inductor coil L3 may be, e.g., a circular copper pipe with only a single turn, having an overall diameter of 67 cm, the pipe having an inner diameter of 0.9 cm.

Capacitors C4 and C5 are parallel to inductor coil L3, forming an LC tank circuit defining the frequency of RF transmission. The transmitter circuit includes two banks of MOSFET amplifiers, the first bank including MOSFET transistors Q1 through Q4, the second bank including MOSFET transistors Q5 through Q8. The transistors in each bank are connected in parallel to increase the current flowing through the banks of amplifiers, thereby increasing the power of the electromagnetic waves transmitted from coil L3. Resistor pairs R2, R4 and R3, R5 protect the gate at start-up and ensure turn off at low voltage. Diodes D1 and D2 are switching diodes cross-connecting the two banks of amplifiers that alternately turn the banks of MOSFETs on and off. Capacitors C2 and C3 sum the outputs of the two banks of amplifiers and are parallel to capacitors C4 and C5. Coils L1 and L2 are filters or choke coils blocking flyback of AC to the power supply. Capacitor C1 may be a ceramic capacitor, and capacitors C2-C5 may be polyester capacitors.

Representative values of the transmitter circuit components are shown in Table 1, as follows.

TABLE 1

Components for Wireless Transmitter

| Component | Value |
|---|---|
| C5 | 0.1 µF |
| C1, C2, C3, C4 | 2.2 µF/300 V |
| Q1-Q8 | IRF 640N N-channel power MOSFET |
| R1 | 1kΩ |
| R2, R3 | 100Ω-1 W |
| R4, R5 | 10kΩ |
| D1, D2 | 1N4007 |
| L1, L2 | 30 turns |
| L3 | 1 turn |

In an example, the input source for the transmitter may be 12 V at 6 A. Resistor R2 is a safety resister, providing a small drop in the voltage to protect the circuit. This resister is a 2 W resister to handle the heat generated by inductors L1 and L2. Each of inductors L1, L2 may have 30 turns and be made from copper, for example. In an example, each of these inductors may be a 100 µH 3 A toroidal power inductor with a 470 µH iron core inductor. Inductors L1, L2 support the MOSFETs and filter the voltage coming from the source. Inductors L1, L21 protect both the capacitors and the MOSFETs from very high temperatures.

The small ceramic capacitor C5 is also for safety and serves to limit the voltage and current that enters the circuit. The gate of each MOSFET set is connected to a diode to drop the voltage coming from the input circuit to the gate of each MOSFET. There are two diodes in the circuit, one for each set of four MOSFETs. These diodes also set the exact voltage needed as an input for the gate of the MOSFET. When the gate of the MOSFET is open, the current will step up immediately to 18 A, which is the value of $I_o$ for the exemplary IRF 640N N-channel power MOSFET. If the MOSFET is changed, then the output current when the gate is open will step up to the $I_o$ value of this MOSFET. Since there are four MOSFETs connected in parallel, the current will increase and will almost reach 20-21 A to the coil L3. The eight MOSFETs are connected in parallel and are used for switching and boosting the current entering the coil L3 for generation of the electromagnetic field. Each MOSFET may have an additional metal housing for cooling (i.e., heat transfer with the environment).

There are two polyester capacitors (2.2 µF) C1, C2 installed before the eight MOSFETs and two polyester capacitors (2.2 µF) C3, C4 also installed after the eight MOSFETs. These capacitors are for stabilizing the current that enter the MOSFETs and also for avoiding current from oscillation. Without these capacitors, the range of the electromagnetic field would vary. The maximum voltage for such polyester capacitors is 300 V. This type of capacitor can handle high temperatures and primarily operate to boost the current and store energy to avoid current drop. These capacitors also protect the circuit from any reflux in the current that may damage the circuit.

Figure 3:
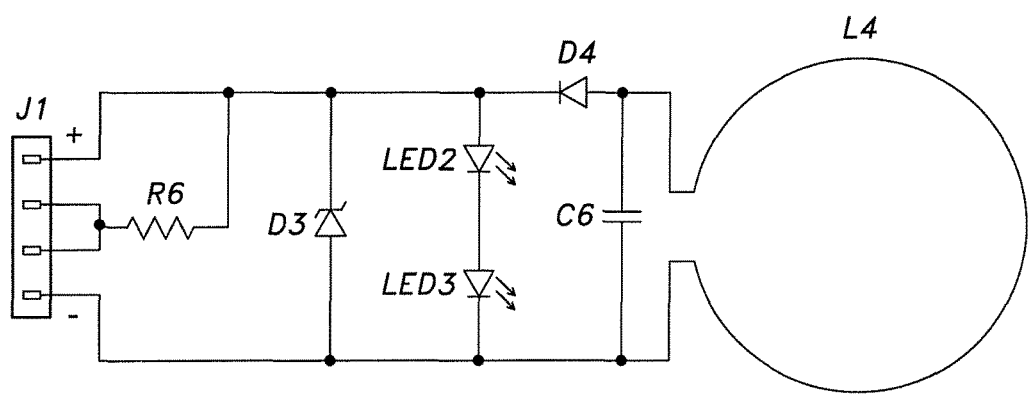
FIG. 3 is a schematic diagram showing circuit components of a wireless receiver of the wireless power transmission system of FIG. 1.

With reference to FIG. 3, the wireless receiver 18 includes inductor L4, which serves as a receiving antenna for receiving the electromagnetic signal S. Capacitor C6 is placed in parallel with inductor L4, which forms a tuned circuit that is resonant at the frequency transmitted from coil L3 of the transmitter circuit. The inductor L4 may be a flat spiral coil or a loop antenna. Diode D4 is placed in series with coil L4 and provides a half-wave rectifier for converting the transmitted electromagnetic waves to the DC current required to charge the user device D, e.g., a cell phone. LED 2 and LED3 are optical LEDs that provide a visual indication of the strength of the received signal. Diode D3 is a Zener diode that limits the voltage of the receiver circuit to the voltage, e.g., 5.1 volts, required by the charging circuit of the user device D. The voltage is supplied to a USB connector J1 or the like, which can be plugged into a suitable jack on the user device D. Resistor R6 ties the USB connector data pins to a bus, and also provides current limiting for the diodes.

Exemplary component values for the wireless receiver of FIG. 3 are shown in Table 2, as follows.

TABLE 2

Components for Wireless Receiver

| Component | Value |
|---|---|
| L4 | 24 turns |
| C6 | 100 µF |
| D3 | 5.1 V Zener diode |
| D4 | 1N4001 |
| R6 | 100kΩ |

Component J1 is shown as a USB connector, which is commonly used for charging cell phone batteries. However, J1 may be a mono or stereo plug, such as those used to charge laptop computer batteries, or any other connector used to charge or power an electronic appliance.

The transmitter-receiver system of FIGS. 2 and 3 transmits and receives power wirelessly by electromagnetic waves. The power received by the wireless receiver circuit of FIG. 3 is almost the same as the power transmitted by the transmitter circuit of FIG. 2, i.e., the system has low loss. The power may be transmitted over longer distances than induction coils, and it is not necessary to align the transmitter and receiver coils.

Figure 4:
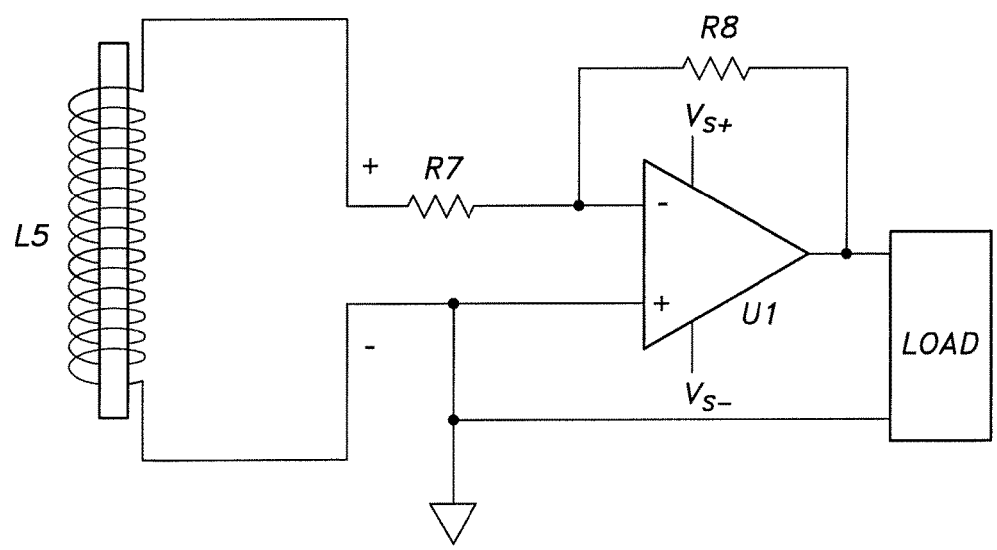
FIG. 4 is a partial schematic diagram of an alternative embodiment of the wireless receiver of the wireless power transmission system of FIG. 1, the rectifier and voltage regulation components being omitted.

FIG. 4 is a partial schematic diagram of an alternative embodiment of a wireless receiver circuit having a different inductor than the wireless receiver circuit of FIG. 3. The inductor L4 of FIG. 3 has an air core. Inductor L4 of FIG. 3 may be a 24-turn coil with a core having a 12 cm diameter. Instead, the inductor L5 of FIG. 4 is a copper coil wound around a graphite core. The inductor L5 of FIG. 4 is capable of receiving the transmission of power from the transmitter circuit of FIG. 2 from a greater distance than the receiver circuit of FIG. 3. However, the inductor L5 of the circuit shown in FIG. 4 receivers power at a lower voltage level and requires the use of an operational amplifier U1 to raise the received voltage to the levels needed to charge the battery of the load or user device D. The operational amplifier U1 of FIG. 4 is configured as an inverting operational amplifier, which has a gain of:

$$\text{Gain} = V_{out}/V_{in} = -R_8/R_7.$$

Thus, if the wireless receiver is required to charge a battery through a USB connector requiring an input of 5.1 volts, then the ratio of the values of resistors R7 and R8 may be determined from:

$$V_{out} = 5.1 = -V_{in}(R_8/R_7).$$

In FIG. 4, the rectifier and voltage regulation components have been omitted for clarity in the drawings. The voltage supply $V_S$ for the operational amplifier, which is a DC voltage, may be supplied by an external source or by the rectified received power, if the voltage is high enough.

In the above, LED1, LED2 and LED3 may each be white light emitting diodes for indication that power is flowing through the circuitry and that the circuit is active. Examples of such light emitting diodes are 5 mm white water clear LEDs, operating at 15° C. with an intensity of 5000 mCd at 20 mA. Further, it should be understood that the values of the inductance for L4 and L5 are not fixed, since the inductance is based upon the distance between the transmitter and the receiver, the surrounding materials that may affect the coupling between the transmitter and the receiver, and the type of device that the receiver is connected to for charging or activation. Thus, L4 may be in the range of approximately 89.76 µH and L5 may be in the range of 86.3-345 µH, but these values are not fixed values, particularly, these values vary depending on a variety of factors, including the temperature, surrounding materials or devices, and the number of devices coupling with the transmitter.

Similarly, as discussed above, resistors R7 and R8 do not have fixed values. For an inverting op-amp of the second receiver, $$V_{out} = -V_{in}(R_8/R_7).$$

In the case of a non-inverting op-amp, $$V_{out} = V_{in}\left(1 + \frac{R_8}{R_7}\right).$$

It should be noted that the non-inverting operational amplifier does not have fixed values and can be designed according to the functionality of the circuit and the desired output voltage. The source voltage, $V_{in}$, is the voltage received from the transmitter, which can be any value depending on the distance between the transmitter and the receiver, as well as the variable factors noted above. The desired voltage, $V_{out}$, will be chosen depending on the load (i.e., the device) connected to the receiver, since the input voltage to these devices varies. The resistors R7 and R8 of the operational amplifier will be designed according to the desired voltage, $V_{out}$, and the received voltage, $V_{in}$. The value of one of these resistors will be assumed and the other one will be calculated. As an example, if the device connected to the receiver is a mobile phone, then it will need almost 5 V to start charging. The input received through this receiver is tested to be almost 3.1 V and, in this example, is negative, since the receiver circuit is not completely grounded and has some charges stored in it. Thus, using the above equations, $$5\,V = -(-3.1)\frac{R_8}{R_7}.$$

For an exemplary value of $R_8$=10 kΩ, $R_7$=6.2 kΩ. It is important to note that setting $R_8$=10 kΩ in the above was for exemplary purposes only and was meant as a simple illustration. In practice, the resistance values are not fixed.

It should be understood that the wireless receiver may be configured for mounting and connection in any desired manner. As an example, the wireless receiver may be mounted within a case associated with the user device D. As another example, the wireless receiver may be integrated into the circuitry of the user device D. As a further example, the wireless receiver may be integrated into an item of furniture, such as a tabletop or the like.

It is to be understood that the wireless power transmission system is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A wireless power transmission system, comprising:
a wireless power transmitter having:
a DC power supply having positive and negative terminals;
first and second banks of MOSFET amplifiers, each of the banks having a plurality of MOSFET power transistors configured in parallel, each of the banks having a corresponding drain bus connecting drains of each of the plurality of MOSFET power transistors included in the bank and a corresponding gate bus connecting gates of each of the plurality of MOSFET power the transistors included in the bank;
a transmitting coil and at least one capacitor connected in parallel to the transmitting coil, the transmitting coil and the at least one capacitor defining an LC tank circuit having a transmitter resonant frequency, the LC tank circuit having opposite sides, wherein the opposite sides are connected across the terminals of the DC power supply, the drain buses of the first and second banks of MOSFET amplifiers being connected to opposite sides of the tank circuit, respectively; and
a first diode connected between the gate bus of the first bank of MOSFET amplifiers and the drain bus of the second bank of MOSFET amplifiers, and a second diode connected between the gate bus of the second bank of MOSFET amplifiers and the drain bus of the first bank of MOSFET amplifiers, the first and second diodes being configured to alternately turn the first and second banks of MOSFET amplifiers on and off at the transmitter resonant frequency; and
a wireless power receiver having:
an inductor and a capacitor in parallel with the inductor, the inductor and the capacitor defining a tuned circuit having a receiver resonant frequency, the receiver tuned circuit having a bandwidth at least partially overlapping a bandwidth of the wireless power transmitter's LC tank circuit, the tuned circuit receiving power transmitted by the wireless power transmitter's transmitting coil;
a rectifier connected to the tuned circuit;
a voltage regulating circuit connected to the rectifier; and
a power connector connected to the voltage regulating circuit for connecting rectified and voltage-regulated power from the wireless receiver to a charging circuit of an electronic device.

2. The wireless power transmission system according to claim 1, wherein said DC power supply comprises a lead-acid battery having a voltage between 6 volts and 12 volts.

3. The wireless power transmission system according to claim 1, wherein said DC power supply comprises an AC adaptor having an AC mains plug, a step-down transformer for lowering mains voltage to a charging voltage, and a rectifier converting the stepped down voltage to a DC voltage.

4. The wireless power transmission system according to claim 1, wherein said DC power supply comprises a photovoltaic panel having an array of solar cells.

5. The wireless power transmission system according to claim 1, wherein each of said first and second banks of MOSFET amplifiers consists of four MOSFET power transistors configured in parallel.

6. The wireless power transmission system according to claim 1, wherein said transmitting coil comprises a flat coil of copper wire.

7. The wireless power transmission system according to claim 1, further comprising first and second inductive filter coils respectively connected between the drain buses and the DC power supply.

8. The wireless power transmission system according to claim 1, wherein said rectifier comprises a diode configured as a half-wave rectifier.

9. The wireless power transmission system according to claim 1, wherein said voltage regulating circuit comprises a Zener diode.

10. The wireless power transmission system according to claim 1, wherein said voltage regulating circuit comprises a 5.1 V Zener diode.

11. The wireless power transmission system according to claim 1, wherein the inductor in the tuned circuit of said wireless received comprises a flat coil.

12. The wireless power transmission system according to claim 1, wherein the inductor in the tuned circuit of said wireless receiver comprises copper wire wound around a graphite core.

13. The wireless power transmission system according to claim 12, wherein said wireless receiver further comprises an operational amplifier circuit connected to said tuned circuit for stepping up voltage of power received from said wireless transmitter to a voltage required for a charging circuit of the electronic device.

14. The wireless power transmission system according to claim 1, wherein the inductor in the tuned circuit of said wireless receiver comprises a loop antenna.

15. The wireless power transmission system according to claim 1, wherein the power connector of said wireless receiver comprises a USB connector.

16. A wireless power transmitter for a wireless power transmission system, comprising:
   a DC power supply having positive and negative terminals;
   first and second banks of MOSFET amplifiers, each of the banks having a plurality of MOSFET power transistors configured in parallel, each of the banks having a corresponding drain bus connecting drains of each of the plurality of MOSFET power transistors included in the bank and a corresponding gate bus connecting gates of each of the plurality of MOSFET power the transistors included in the bank;
   a transmitting coil and at least one capacitor connected in parallel to the transmitting coil, the transmitting coil and the at least one capacitor defining an LC tank circuit having a transmitter resonant frequency, the LC tank circuit having opposite sides, wherein the opposite sides are connected across the terminals of the DC power supply, the drain buses of the first and second banks of MOSFET amplifiers being connected to opposite sides of the tank circuit, respectively; and
   a first diode connected between the gate bus of the first bank of MOSFET amplifiers and the drain bus of the second bank of MOSFET amplifiers, and a second diode connected between the gate bus of the second bank of MOSFET amplifiers and the drain bus of the first bank of MOSFET amplifiers, the first and second diodes being configured to alternately turn the first and second banks of MOSFET amplifiers on and off at the transmitter resonant frequency.

17. The wireless power transmitter according to claim 16, wherein each of said first and second banks of MOSFET amplifiers consists of four MOSFET power transistors configured in parallel.

* * * * *